June 5, 1962
H. B. MATTHEWS
3,037,735
TRACKLESS SIX-WAY SEAT ADJUSTER
Filed Oct. 13, 1958
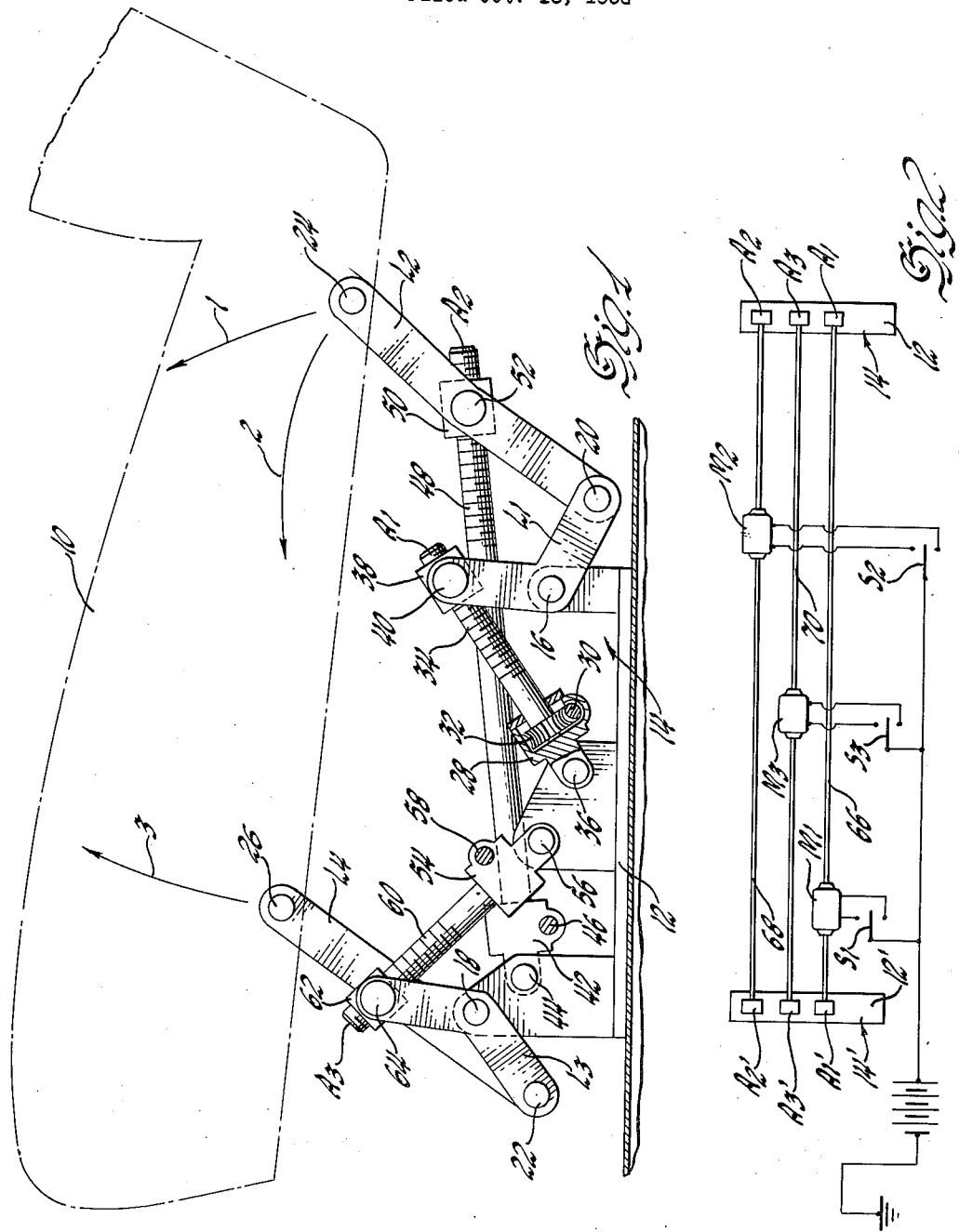
INVENTOR.
Hugh B. Matthews
BY
ATTORNEY 3,037,735
TRACKLESS SIX-WAY SEAT ADJUSTER
Hugh B. Matthews, Birmingham, Mich., assignor to General Motors Corporation, Detroit, Mich., a corporation of Delaware
Filed Oct. 13, 1958, Ser. No. 766,762
14 Claims. (Cl. 248—394)

This invention relates to vehicle seat adjusters and more particularly to a trackless seat adjuster that provides six-way action.

Seat adjusters which provide selective adjustments in horizontal, vertical and tilt directions are well known and they commonly employ tracks for the horizontal adjustments and front and rear links for the vertical and tilt adjustments. The subject seat adjuster dispenses with the tracks and employs a novel linkage to provide the six-way action.

In the drawings:

FIGURE 1 is a side elevation of the right-hand seat adjuster; and

FIGURE 2 is a schematic plan view of the right- and left-hand seat adjusters.

Referring to the drawings, the seat 10 is adjustably supported on the floor members 12 and 12' of right- and left-hand seat adjusters 14 and 14' which are of similar construction. Each adjuster has first and second links L1 and L2 to support the rear portion of the seat and third and fourth links L3 and L4 to support the front portion. The links L1 and L3 are bell cranks links and have fulcrum pivot connections to the floor member 12 at 16 and 18. The links L2 and L4 are generally straight and have pivot connections 20 and 22 at their lower ends to the lower ends of the links L1 and L3. Pivot connections 24 and 26 secure the upper ends of the links L2 and L4 to the seat.

First, second and third individually operable screw jack actuators A1, A2 and A3 are employed to retain the linkage in various positions and thus provide selective horizontal, vertical and tilt adjustments for the seat. The actuator A1 comprises a housing 28 having a worm 30 in mesh with the pinion 32 of a screw shaft 34. The housing 28 has a pivot connection 36 to the floor member 12 and a nut 38, which is threaded on the screw shaft 34, has a pivot connection 40 to the upper end of the link L1. Rotation of the worm 30 will thus move the nut 38 along the screw shaft 34 and swing the link L1 about its fulcrum pivot connection 16. The actuator A2 has a housing 42 with a floor pivot connection 44, a worm 46, a screw shaft 48 and a nut 50 having a pivot connection 52 with the link L2 intermediate the ends thereof. The actuator A3 has a housing 54 having a floor pivot connection 56, a worm 58, a screw shaft 60 and a nut 62 having a pivot connection 64 with the upper end of the link L3.

The actuators of the right- and left-hand adjusters are paired and each pair is powered by a reversible electric motor, a motor M1 being connected by a flexible cable 66 to the worms of the actuators A1 and A1', a motor M2 being connected by a cable 68 to the actuators A2 and A2' and a motor M3 being connected by a cable 70 to the actuators A3 and A3'. Switches S1, S2 and S3 enable the driver to operate the motors M1, M2 and M3 in either direction, either individually or together.

If the seat is downward and rearward as in FIGURE 1, individual operation of the switch S2 will move the seat forward along the path of the arrow 2, the links L2 and L4 being swung forwardly on the then stationary pivots 20 and 22 by the actuator A2. An individual operation of the switch S3 will cause the actuator A3 to swing the link L3 clockwise on the fixed pivot 18 and raise the link L4 to move the front portion of the seat upward along the path of the arrow 3, the pivot 24 then being a stationary pivot point for the seat. Individual operation of the switch S1 will move the rear portion of the seat upward along the path of the arrow 1. In this instance, the pivot 22 serves as a stationary pivot for the seat by way of the link L4 while the actuator A1 swings the link L1 counterclockwise about the fixed pivot 16 to swing the link L2, the actuator A2 and the rear portion of the seat upward; the actuator A2 being swung about the fixed pivot 44. The switches can be operated together, if desired.

While the embodiment of the invention here described is preferred, it is understood that modifications may be made by the exercise of skill in the art which will lie within the scope of the invention.

I claim:

1. A seat adjuster comprising a floor member, a seat member, first and second links having a pivot connection with each other, third and fourth links having a pivot connection with each other, the first and third links each having a pivot connection with one of the members, the second and fourth links each having a pivot connection with the other member, and first, second and third individually operate motor powered actuators operatively connected to said links to retain the same in various positions and thus provide selective horizontal, vertical and tilt adjustments for the seat member.

2. A seat adjuster according to claim 1 wherein the first actuator is connected to the first link to swing the same about its pivot connection with the one member, the second actuator is connected to the second link to swing the same about its pivot connection with the first link, and the third actuator is connected to the third link to swing the same about its pivot connection with the one member.

3. A seat adjuster according to claim 2 wherein each actuator comprises a pair of jack elements relatively movable in longitudinal direction, one jack element having a pivot connection with the one member and the other jack element having a pivot connection with the respective link.

4. A seat adjuster according to claim 3 wherein each actuator comprises a screw jack.

5. A seat adjuster according to claim 4 wherein the floor member is the one member and the seat member is the other member.

6. A seat adjuster comprising a floor member, a seat member, first and second links having their lower ends pivotally connected together, third and fourth links having their lower ends pivotally connected together, the first and third links being bell cranks and each having a fulcrum pivot connection with the floor member, the second and fourth links being generally straight and each having their upper ends pivotally connected with the seat member, and first, second and third individually operable screw jack actuators each pivotally connected to said links and floor member to retain said links in various positions and thus provide selective horizontal, vertical and tilt adjustments for the seat member, the link connection of the first actuator being to the upper end of the first link, the linkage connection of the second actuator being to the second link intermediate the ends thereof and the link connection of the third actuator being to the upper end of the third link.

7. A seat supporting device comprising a base member having spaced posts thereon, a seat support member, bellcranks pivotally connected to one of said members, linkage connected between said bellcranks and the other of said members for effecting substantially horizontal movement of said seat support member relative to said base member, first power means connected between said base member and said seat support member effective to move said seat support member and bellcranks substantially horizontally to effect fore and aft seat adjustment, second power means connected between one of said members and one of said bellcranks to swing said one bellcrank relative to said seat support member to effect vertical adjustment of the adjacent end of said seat support member, and third power means connected between one of said members and the other of said bellcranks to swing said other bellcrank relative to said seat support member to effect vertical adjustment of the adjacent end of said seat support member.

8. A seat supporting device comprising a base member and a seat support member, bellcranks pivotally connected to one of said members adjacent opposite ends thereof, linkage connected between said bellcranks and the other of said members for effecting substantially horizontal movement of said seat support member relative to said base member, first power means connected to said seat support member to move said seat support member and said bellcranks substantially horizontally to effect fore and aft seat adjustment, second power means connected to one of said bellcranks to swing said one bellcrank relative to said seat support member to effect vertical adjustment of the adjacent end of said seat support member, and third power means connected to the other of said bellcranks to swing said other bellcrank relative to said seat support member to effect vertical adjustment of the adjacent end of said seat support member, said power means including mechanical drive elements and means for locking said drive elements in adjusted position.

9. A seat supporting device comprising a base member and a seat support member, bellcranks pivotally connected to one of said members adjacent opposite ends thereof, linkage connected between the other of said members and said bellcrank for effecting substantially horizontal movement parallel to said base member, first power means connected to said seat support member effective to move said seat support member and bellcranks substantially horizontally to effect fore and aft seat adjustment, second power means connected to one of said bellcranks to swing said one bellcrank relative to said seat support member to effect vertical adjustment of the adjacent end of said seat support member, and third power means connected to the other of said bellcranks to swing said other bellcrank relative to said seat support member to effect vertical adjustment of the adjacent end of said seat support member, said power means including elongated rigid drive elements, selectively operable means for actuating said elements to effect movement of said bellcranks and effective when inactive to retain said elements against substantial longitudinal movement.

10. A seat supporting device comprising a base member and a seat support member, bellcranks pivotally connected to one of said members adjacent opposite ends thereof, linkage connected between the other of said members and said bellcranks for effecting substantially horizontal movement parallel to said base member, first power means connected to said seat support member effective to move said support member and bellcranks substantially horizontally to effect fore and aft seat adjustment, second power means connected between said seat support member and one of said bellcranks to swing said one bellcrank relative to said seat support member to effect vertical adjustment of the adjacent end of said seat support member, third power means connected between said seat support member and the other of said bellcranks to swing said other bellcrank relative to said seat support member to effect vertical adjustment of the adjacent end of said seat support member, said power means including a first worm and worm gear assembly mounted on said base member for effecting fore and aft seat adjustment, a pair of independently operable worm and worm gear assemblies for effecting vertical adjustment at each end of said support member, jack screw means operably connected to said worm gears and to said bellcranks, and selectively operable control means to effect independent actuation of each of said worm and worm gear assemblies.

11. A seat supporting device comprising a base member and a seat supporting member, bellcranks pivotally connected to one of said members adjacent opposite ends thereof, linkage connected between the other of said members and said bellcranks for effecting substantially horizontal movement of said seat support member relative to said base member, and power means for selectively actuating said linkage to effect fore and aft adjustment of said seat support member and angular movement of said bellcranks in any position of said linkage to effect vertical movement of said seat support member.

12. The apparatus as defined in claim 11 and wherein said power means includes independent means connected to said bellcranks for effecting separate movement thereof to tilt said seat support member or to uniformly raise and lower said seat support member by combined movement thereof.

13. The structure as defined in claim 11 and wherein the power means includes elongated rigid drive elements, selectively operable means for actuating said elements to effect movement of said bellcranks and effective when inactive to retain said elements against substantial longitudinal movement.

14. A seat supporting device comprising a base member and a seat support member, bellcranks having oppositely extending leg portions connected by a central portion, said bellcranks being pivotally connected at said central portion to one of said members adjacent opposite ends thereof, linkage connected between the other of said members and one leg portion of each of said bellcranks for effecting substantially horizontal movement of said seat support member parallel to said base member, first power means connected to said seat support member effective to move said seat support member and said bellcranks substantially horizontally to effect fore and aft seat adjustment, second power means connected to the other leg portion of one of said bellcranks to swing said one bellcrank relative to said seat support member to effect vertical adjustment of the adjacent end of said seat support member, and third power means connected to the other leg portion of the other of said bellcranks to swing said other bellcrank relative to said seat support member to effect vertical adjustment of the adjacent end of said seat support member, and control means connected to said power means for effecting independent movement thereof to tilt said seat support member or for combined movement thereof to uniformly raise and lower said seat support member.

References Cited in the file of this patent

UNITED STATES PATENTS

| | | |
|---|---|---|
| 2,227,764 | Saunders et al. | Jan. 7, 1941 |
| 2,256,004 | Thomas | Sept. 16, 1941 |
| 2,641,305 | Oishei | June 9, 1953 |
| 2,707,137 | Hollstein | Apr. 26, 1955 |
| 2,809,688 | Brundage | Oct. 15, 1957 |
| 2,942,647 | Pickles | June 28, 1960 |

FOREIGN PATENTS

| | | |
|---|---|---|
| 513,262 | Great Britain | Oct. 9, 1939 |

UNITED STATES PATENT OFFICE
CERTIFICATE OF CORRECTION

Patent No. 3,037,735            June 5, 1962

Hugh B. Matthews

It is hereby certified that error appears in the above numbered patent requiring correction and that the said Letters Patent should read as corrected below.

Column 2, line 25, for "operate" read -- operable --; line 62, for "linkage" read -- link --.

Signed and sealed this 25th day of September 1962.

(SEAL)
Attest:

ERNEST W. SWIDER
Attesting Officer

DAVID L. LADD
Commissioner of Patents